(12) United States Patent
Svec et al.

(10) Patent No.: US 9,457,354 B2
(45) Date of Patent: Oct. 4, 2016

(54) SYSTEM AND METHOD FOR CONTINUOUS PROCESSING OF RECYCLABLE MATERIAL

(71) Applicant: Building Materials Investment Corporation, Wilmington, DE (US)

(72) Inventors: James A. Svec, Kearny, NJ (US); Denis Muki Tibah, Dallas, TX (US); Keith Edward Stephens, Waxahachie, TX (US)

(73) Assignee: BUILDING MATERIALS INVESTMENT CORPORATION, Wilmington, DE (US)

( * ) Notice: Subject to any disclaimer, the term of this patent is extended or adjusted under 35 U.S.C. 154(b) by 520 days.

(21) Appl. No.: 13/916,713

(22) Filed: Jun. 13, 2013

(65) Prior Publication Data

US 2014/0263779 A1    Sep. 18, 2014

Related U.S. Application Data

(60) Provisional application No. 61/787,370, filed on Mar. 15, 2013.

(51) Int. Cl.
| | |
|---|---|
| *B02C 19/00* | (2006.01) |
| *B09B 3/00* | (2006.01) |
| *B29L 31/10* | (2006.01) |
| *E01C 19/10* | (2006.01) |
| *C08L 95/00* | (2006.01) |

(52) U.S. Cl.
CPC ............ *B02C 19/0056* (2013.01); *B09B 3/00* (2013.01); *B29L 2031/108* (2013.01); *C08L 95/00* (2013.01); *E01C 19/10* (2013.01)

(58) Field of Classification Search
CPC .......... E01C 19/1036; E01C 19/1004; E01C 19/10; B02C 19/0056; B09B 3/00; B29L 2031/108; C08L 95/00
USPC ....................................................... 366/7, 16
See application file for complete search history.

(56) References Cited

U.S. PATENT DOCUMENTS

| | | | |
|---|---|---|---|
| 1,462,904 A * | 7/1923 | Finley ................. | E01C 19/1027 366/228 |
| 1,782,186 A | 11/1930 | Abson | |
| 2,179,208 A | 11/1939 | Burk et al. | |
| 2,200,914 A | 5/1940 | Burk et al. | |
| 2,233,259 A | 2/1941 | Harth | |
| 2,375,117 A | 5/1945 | Lentz | |

(Continued)

OTHER PUBLICATIONS

U.S. Appl. No. 14/143,074, filed Dec. 30, 2013.

(Continued)

*Primary Examiner* — Tony G Soohoo
(74) *Attorney, Agent, or Firm* — Baker Botts L.L.P.

(57) ABSTRACT

A continuous system for making shingles from recyclable material is provided comprising a milling device to receive recyclable material and process the recyclable material into particulate and a transfer device to receive and transfer the particulate from the milling device. An apparatus receives the particulate from the transfer device and weighs the particulate. A continuous processor receives the particulate and reacts and/or mixes the particulate with at least one admixture to form a homogenous mixture. A filler mixer receives the homogenous mixture and incorporates the homogenous mixture with shingle material to form core product and a control panel controls input of the homogenous mixture into the filler mixer.

22 Claims, 2 Drawing Sheets

(56) References Cited

U.S. PATENT DOCUMENTS

| | | | |
|---|---|---|---|
| 2,450,756 A | 10/1948 | Hoiberg | |
| 2,762,755 A | 9/1956 | Kinnaird, Jr. | |
| 3,126,329 A | 3/1964 | Fort | |
| 3,281,383 A | 10/1966 | Zelinski et al. | |
| 3,678,134 A | 7/1972 | Middlebrook | |
| 4,325,641 A * | 4/1982 | Babus | B09B 5/00 241/101.8 |
| 4,338,137 A | 7/1982 | Goodrich | |
| 4,584,023 A | 4/1986 | Goodrich | |
| 4,706,893 A * | 11/1987 | Brock | E01C 19/1036 106/282 |
| 4,837,252 A | 6/1989 | Seguin et al. | |
| 4,867,572 A | 9/1989 | Brock et al. | |
| 5,002,987 A | 3/1991 | Schulz | |
| 5,090,861 A | 2/1992 | Malcolm et al. | |
| 5,098,025 A | 3/1992 | Drouin et al. | |
| 5,102,487 A | 4/1992 | Lamb | |
| 5,201,472 A * | 4/1993 | Brock | B03B 9/065 241/101.8 |
| 5,303,999 A * | 4/1994 | Nath | E01C 19/1004 34/560 |
| 5,470,146 A | 11/1995 | Hawkins | |
| 5,626,659 A | 5/1997 | Chivers | |
| 5,810,471 A * | 9/1998 | Nath | E01C 19/1004 34/135 |
| 5,937,037 A | 8/1999 | Kamel et al. | |
| 6,039,914 A | 3/2000 | Gehrke et al. | |
| 6,194,519 B1 | 2/2001 | Blalock et al. | |
| 6,478,461 B1 * | 11/2002 | Frank | B01D 45/08 34/135 |
| 6,497,930 B1 | 12/2002 | Petermeier | |
| 6,521,076 B1 | 2/2003 | Elliot | |
| 6,743,313 B2 | 6/2004 | Mischo | |
| 7,037,961 B2 | 5/2006 | Rivas et al. | |
| 7,052,635 B2 | 5/2006 | Mischo | |
| 7,297,301 B1 | 11/2007 | Deschamps et al. | |
| 7,805,909 B2 | 10/2010 | Teng et al. | |
| 7,901,563 B2 | 3/2011 | Ruan et al. | |
| 7,913,940 B2 * | 3/2011 | Harmon | B09B 3/00 241/21 |
| 8,192,539 B2 | 6/2012 | Barger et al. | |
| 2002/0066813 A1 | 6/2002 | Mischo | |
| 2002/0107312 A1 | 8/2002 | Lucchi et al. | |
| 2002/0111401 A1 | 8/2002 | Izumoto | |
| 2002/0131321 A1 * | 9/2002 | Hawkins | E01C 19/1036 366/7 |
| 2004/0179422 A1 * | 9/2004 | Hawkins | E01C 19/1036 366/7 |
| 2007/0070801 A1 * | 3/2007 | Musil | E01C 19/1036 366/7 |
| 2008/0041982 A1 | 2/2008 | Paulson et al. | |
| 2009/0133834 A1 | 5/2009 | Lechat et al. | |
| 2009/0229491 A1 * | 9/2009 | Harmon | B09B 3/00 106/273.1 |
| 2010/0020630 A1 * | 1/2010 | Musil | E01C 19/05 366/4 |
| 2011/0049275 A1 | 3/2011 | Zickell et al. | |
| 2012/0248231 A1 | 10/2012 | Fredsall | |
| 2013/0042793 A1 | 2/2013 | Peregrine et al. | |

OTHER PUBLICATIONS

U.S. Office Action mailed Mar. 18, 2015, for U.S. Appl. No. 14/143,074.

* cited by examiner

SYSTEM AND METHOD FOR CONTINUOUS PROCESSING OF RECYCLABLE MATERIAL

RELATED APPLICATION

This application claims the benefit of U.S. Provisional Patent Application Ser. No. 61/787,370, filed Mar. 15, 2013, the contents of which is hereby incorporated by reference in its entirety herein.

BACKGROUND OF THE DISCLOSED SUBJECT MATTER

1. Field of the Disclosed Subject Matter

The disclosed subject matter relates to a system and method for continuous processing of recyclable material, such as recycled asphalt shingles.

2. Description of the Related Art

Asphalt offers outstanding binding and waterproofing characteristics. These physical attributes of asphalt have led to its widespread utilization in paving, roofing, and waterproofing applications. For instance, asphalt is used in manufacturing roofing shingles because it has the ability to bind sand, aggregate, and fillers to the roofing shingle while simultaneously providing excellent water barrier characteristics.

Naturally occurring asphalts have been used in various applications for hundreds of years. However, today almost all of the asphalt used in industrial applications is recovered from the refining of petroleum. Asphalt, or asphalt flux, is essentially the residue that remains after gasoline, kerosene, diesel fuel, jet fuel, and other hydrocarbon fractions have been removed during the refining of crude oil. In other words, asphalt flux is the last cut from the crude oil refining process.

To reduce the reliance on naturally occurring asphalts alone, previously used products, such as asphalt shingles, can be recycled, further processed, and used as material for creating new products in need of asphalt. To meet performance standards and product specifications, asphalt shingles recovered from previous use are normally treated or processed to attain desired physical characteristics and to attain uniformity. For instance, asphalt that is employed in manufacturing roofing products typically needs to be treated to meet the special requirements demanded in roofing applications. More specifically, in the roofing industry it is important to prevent asphaltic materials from deforming under conditions of high temperature, such as those encountered during hot summers. In other words, the asphaltic materials used in roofing products should maintain desired characteristics such as, for example, a certain level of stiffness (hardness) at high temperatures. The desired level of stiffness can be characterized by a reduced penetration, an increased viscosity, and an increased softening point, for purposes of example.

However, the process of recycling products such as asphalt shingles can be costly and can involve consumption of a large amount of energy needed to heat the recycled material to be available for sufficient application. For example, some known processes of recycling asphalt shingles use a batch process system. Batch process systems use batch tanks, storage tanks, and heat exchangers to mix asphalt with recycled asphalt shingles in a mix tank. A diluted pumpable mixture of recycled asphalt shingles and asphalt is created, circulated, and delivered to a filler mixer. The batch process system uses large amounts of energy to heat the additional diluted asphalt and the recycled asphalt shingles.

Furthermore, in known batch process systems, supply of diluted recycled asphalt shingle coating is used as a second coating to the shingle making process. In the batch process system, the recycled asphalt shingle coating is mixed and heated and circulated for additional heating as well as conditioned with enough unrecycled asphalt coating to make the mixture pumpable through looping circulation lines. The mixture is used as the sole coating supply for the shingle production line. The mixture is pumped into the filler mixer and then transferred into the coating process. Either the standard coating (with unrecycled product) or the recycled asphalt shingle coating system can be used. In the batch process, an asphalt coating—either with or without the recycled asphalt shingle—is used for the process run. If using the batch system and two kinds of coatings is desired (both a standard coating system in addition to a recycled asphalt shingle coating system), then two complete coating supply systems will be needed, thus duplicating systems and energy costs.

Furthermore, in batch process systems, a conventional mixer typically takes at least two hours to thoroughly mix a batch of asphalt formulation. A conventional mixer and can take up to four hours or more to thoroughly mix a batch of asphalt formulation. This extended amount of time required for processing can lead to degradation of the asphalt, polymer modifiers, and other chemical additives due to exposure to heat throughout the processing.

Thus, there remains a continued need for an efficient and economic system for processing recyclable materials, such as recycled asphalt shingles. The presently disclosed subject matter satisfies these and other needs.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a continuous system for making shingles from recyclable material comprising a milling device to receive recyclable material and process the recyclable material into particulate and a transfer device to receive and store the particulate from the milling device. An apparatus receives the particulate from the transfer device and weighs the particulate. A continuous processor receives the particulate and energizes and mixes the particulate with at least one admixture to form a homogenous mixture. A filler mixer receives the homogenous mixture and incorporates the homogenous mixture with shingle material to form shingle core and a control panel controls input of the homogenous mixture into the filler mixer.

In accordance with another aspect of the disclosed subject matter, a method of processing recyclable material is provided, comprising providing recyclable material to a milling device and grinding the recyclable material into particulate by the milling device. The method further includes transferring the particulate with a transfer device, weighing the particulate with an apparatus, and at least one of reacting and mixing the particulate with at least one admixture with a continuous processor to form a homogenous mixture. The method further includes incorporating the homogenous mixture with shingle material with a filler mixer to form core product and controlling the input of homogenous mixture into the filler mixer with a control panel.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Reference will now be made in detail to embodiments of the disclosed subject matter, an example of which is illustrated in the accompanying drawings. The disclosed subject matter will be described in conjunction with the detailed description of the system.

In accordance with the disclosed subject matter, a continuous system for making shingles from recyclable material is provided comprising a milling device to receive recyclable material and process the recyclable material into particulate and a transfer device to receive and store the particulate from the milling device. An apparatus receives the particulate from the transfer device and weighs the particulate. A continuous processor receives the particulate and energizes and mixes the particulate with at least one admixture to form a homogenous mixture. A filler mixer receives the homogenous mixture and incorporates the homogenous mixture with shingle material to form shingle core and a control panel controls input of the homogenous mixture into the filler mixer.

Figure 1:
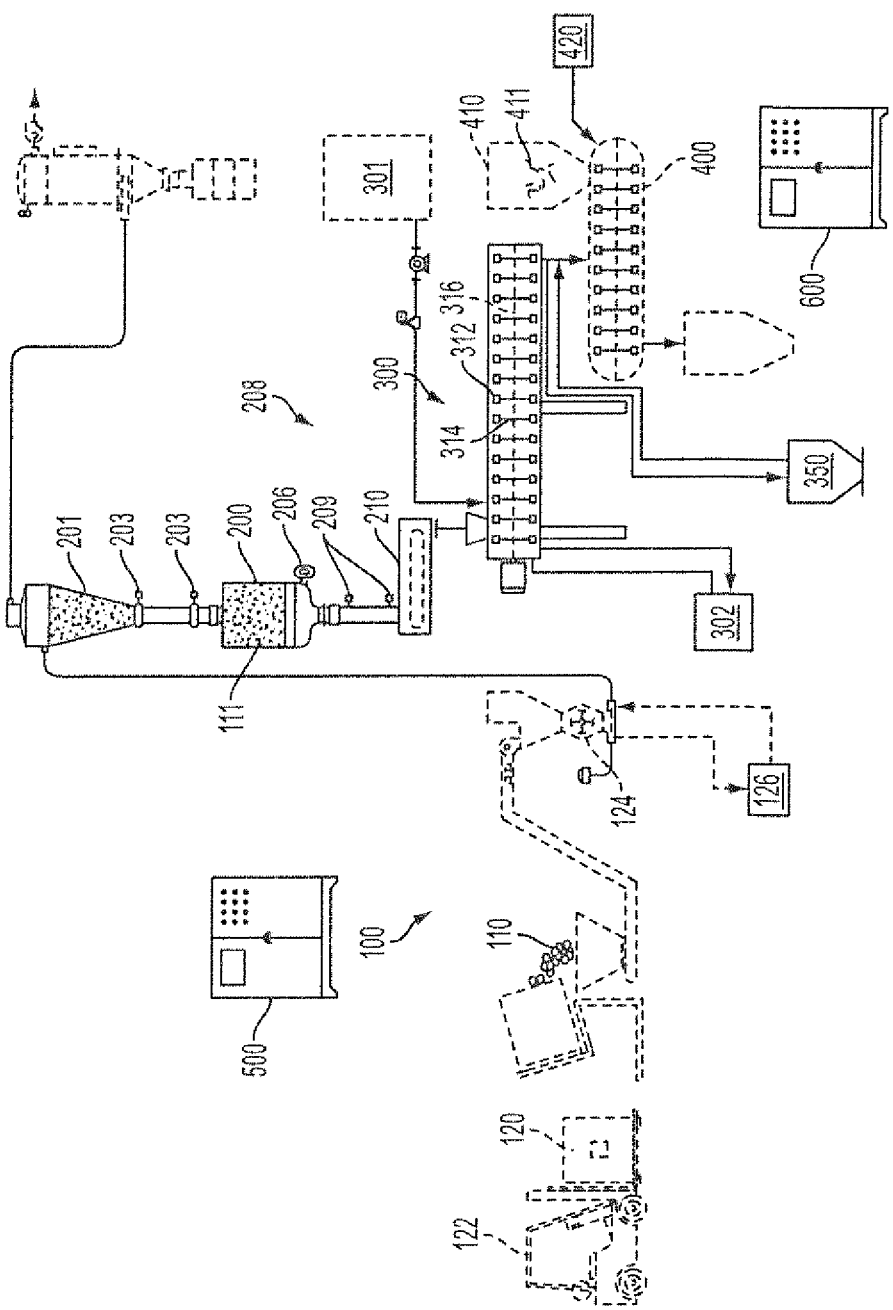
FIG. 1 is a system and method for continuous processing of recyclable material, according to an embodiment of the disclosed subject matter.

Solely for purpose of illustration, FIG. 1 depicts an embodiment of a system and method for processing recyclable material. The examples herein are not intended to limit the scope of the disclosed subject matter in any manner. Particularly, and as illustrated, recyclable material 110, such as recycled asphalt shingles, can be delivered to a production site by conventional known methods, such as by carrier tote 120, delivery devices 122, and distribution system 100. A milling device 124 can receive the recyclable material 110 and process the recyclable material 110 into particulate. Examples of a suitable milling device 124 include, but is not limited to, a grinding mill, a hammer mill, and industrial grinders, as known in the art. The recyclable material is transformed into particulate 111 and thus reduced to a predetermined particle size, such as for example, but not limitation, a size ranging from about 0 to about 1000 microns, or is otherwise ground to a powder form. In some embodiments, the processed recyclable material is optionally transferred to a separation system 126 to remove unwanted aggregate from the desired particulate 111.

As depicted in FIG. 1, the particulate is transferred to a transfer system from either the milling device 124 or the separation system 126. Known methods of transferring products, such as for example pumps and piping systems, can be used with embodiments of the disclosed subject matter. The transfer system includes a transfer device 200 to transfer the particulate 111. One suitable transfer device is a hopper, but other known transfer devices are furthermore contemplated herein. The transfer system can further include a cyclone 201 and dump valves 203 to control and store the influx of particulate 111 to the transfer device 200. The transfer device 200 can include a bin activator feeder 206 to manage output of the particulate. The bin activator feeder 206 can furthermore include valve systems 209, as depicted in FIG. 1. Other embodiments contemplate a tube system in lieu of the bin activator feeder. Other suitable arrangements for the transfer system are contemplated herein as known in the art.

An apparatus 208 can receive the particulate 111 from the transfer device 200 and weigh/meter the particulate 111. In an embodiment of the disclosed subject matter, the apparatus 208 includes a conveying system 210 to convey and weigh the particulate 111 received from the transfer device 200. An example of a suitable conveying system 210 is a weigh belt. The weigh belt can include a belt/pulley mechanism to transfer the particulate and weigh the amount of particulate being transferred. Thus, the apparatus 208 controls a rate and volume of particulate 111 output. Any suitable rate and volume of particulate can be utilized in the system and method, as desired and further discussed below.

According to one embodiment, the apparatus 208 transfers the particulate 111 to a holding device (not shown). In other embodiments and with respect to FIG. 1, the apparatus transfers the particulate 111 to a continuous processor 300, as further discussed herein. The apparatus 208 can continuously feed the particulate into the continuous processor 300. The continuous processor 300 can receive the particulate 111 from the apparatus 208 (or a holding device, when used).

The continuous process 300 can further receive at least one admixture from a supply device 301. The continuous processor 300 can react and/or mix the particulate 111 with the at least one admixture to form a homogenous mixture. The continuous processor 300 can continuously react and/or mix the substances therein. The particulate can comprise any suitable weight percentage of the homogenous mixture, for example, between of about 5 weight percent to about 70 weight percent of the homogenous mixture.

The at least one admixture can include a plurality of suitable materials. Suitable admixtures include, but are not limited to, oxidized coatings, polymers, radial block copolymers, resins, oils, stabilizers, anti-statics, fillers (such as talc, calcium carbonate and carbon black), limestone, polyphosphoric acid, ground tire rubber, flame retardants, and asphalt modification polymers. Other suitable admixtures are furthermore described in concurrently filed U.S. patent application No. 61/791,363, with a filing date of Mar. 15, 2013, entitled, "Continuous Processing of Asphalt Formulations" by inventors James A. Svec, Keith E. Stephens, and Denis M. Tibah, and owned by the assignee of the present application, the contents of which are herein incorporated by reference in their entirety.

The continuous processor 300 can utilize any method or suitable device to react the particulate and the at least one admixture, such as thermal energy, heat, or laser devices. For example, the continuous processor 300 can further include at least one oil jacket to either heat or cool the homogenous mixture, depending on the application of the continuous processor. Embodiments of the disclosed subject matter furthermore contemplate two or more hot oil jackets used with the system and method. The two or more hot oil jackets can be layered. In one embodiment, a first hot oil jacket can be used for heating whereas a second hot oil jacket can be used for cooling. Further embodiments contemplate a single hot oil jacket being used for both heating and cooling. As depicted in FIG. 1, the oil for the oil jacket can be supplied by an oil heater 302.

The continuous processor 300 furthermore transfers energy into the homogenous mixture by continuous mixing. As such, the continuous processor comprises a mechanical heat transfer of from approximately 12,000 BTUs to approximately 75,000 BTUs, to maximize the heat transfer from the continuous processor to the homogenous mixture and reduce loss of energy. However, depending on the size of the continuous processor, the mechanical heat transfer can be less than 12,000 BTUs and greater than 75,000 BTUs. The continuous processor energizes the homogenous mixture for a residence time up to about 20 minutes at a temperature which is preferably within the range of about 250° F. to about 450° F. In another embodiment, the continuous processor energizes the homogenous mixture at a temperature range of about 300° to about 425° F. According to another embodiment, the residence time preferably comprises up to about 10 minutes for the homogenous mixture to reach a temperature which is within the range of about 250° F. to about 450° F. The residence time can be dependent on one or a plurality of factors such as, but not limited to, a capacity or size of the continuous processor, the operation of a mixing system within the continuous processor as further discussed below, and the amount of products input into the continuous processor. However, even with such dependencies, the system and method according to the disclosed subject matter greatly shortens the overall processing time of mixing recyclable material into the production process. The continuous processor 300 mixes the homogenous mixture to any suitable density and suitable specific gravity, such as for example, a specific gravity ranging from approximately 1 to approximately 3.5. Furthermore, the continuous processor can process the homogenous mixture at any suitable rates, such as for purposes of example, but not limitation, at rates of about 1,000 pounds/hour to about 15,000 pounds/hour at desired temperature. With continuous processors of greater size, the rate can exceed 15,000 pounds/hour. With smaller continuous processors, the rate can reduce to below 1000 pounds/hour.

Figure 2:
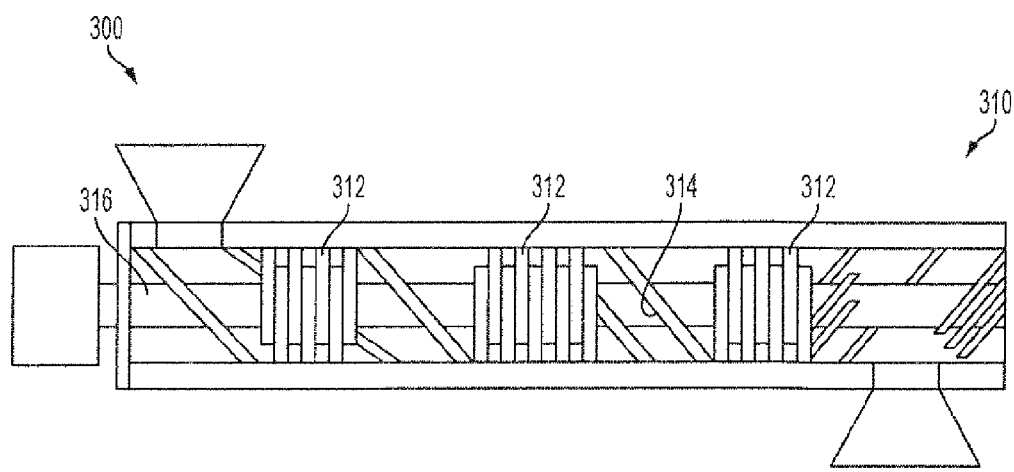
FIG. 2 is an example of a continuous processor according to an embodiment of the disclosed subject matter.

An example of a suitable continuous processor is a Readco continuous processor manufactured by Readco Kurimoto, LLC. A detailed view of an embodiment of the continuous processor is depicted in FIG. 2. The continuous processor 300 can comprise a mixing system 310 including a paddle system 312, a screw system 314, and a shaft support system 316 to mix the particulate 111 with the at least one admixture. The operation of the mixing system 310 can either increase or decrease the residence time of the homogenous mixture in the continuous processor, as desired. The paddle system 312 can include any suitable paddles, such as for example, 5 inch paddles and 10 inch paddles, depending on a size of the continuous processor. The shaft support system 316 can include at least one shaft. Other detailed information regarding suitable devices for the continuous processor 300 are furthermore described in the concurrently filed U.S. Patent Application No. 61/791,363, the contents all of which are herein incorporated by reference in its entirety.

Turning back to FIG. 1, the homogenous mixture, at the desired temperature, can furthermore be output to a holding tank 350 or can be output directly to a filler mixer 400. If the holding tank 350 is utilized in the system and method, then the holding tank 350 can subsequently output the homogenous mixture to the filler mixer 400. The holding tank can function as a buffer to the production line such that the holding tank can receive any material in the system if the production line needs to stop. Other known devices to hold the homogenous mixture are furthermore contemplated herein.

A filler mixer 400 can receive the homogenous mixture either directly from the continuous processor 300 or from the holding tank 350. When the continuous processor 300 directly feeds the filler mixer 400, the homogenous mixture can be continuously feed to the filler mixer 400, as desired. From either source, the filler mixer 400 receives the homogeneous mixture at a temperature which is preferably within the range of about 250° F. to about 450° F. The filler mixer 400 incorporates the homogenous mixture with shingle material 411 to form a core product, such as shingle core used for creating asphalt shingles. The filler mixer 400 can receive the shingle material from a first source 410. The shingle material 411 can comprise any suitable material such as virgin base asphalt and filler, as known in the art. The filler mixer 400 can also receive coating material from a second source 420. The coating material can comprise any suitable material, such as for example, asphalt and filler.

The filler mixer 400 mixes all the input ingredients to form a core product, such as the shingle core used to create asphalt shingles. The amount of each ingredient used to form the core product can vary depending on the desired use of the core product or the desired end characteristics of the core product. In an embodiment of the disclosed subject matter, the core product comprises 0 to 30% of homogenous mixture.

A control panel 500 controls operations behind the development of the homogenous mixture including controlling the input of the homogenous mixture into the filler mixer 400. Furthermore, the control panel 500 can also control the transfer device 200 and the bin activator feeder 206 to output a predetermined amount of particulate to the apparatus 208.

A main control panel 600 can control operation of the filler mixer 400 independent of the operation of the continuous processor 300. The main control panel 600 can control the input of the shingle material 411 into the filler mixer 400, whereas and the control panel 500 can control the input of homogenous mixture into the filler mixer 400. The control panel 500 can vary the weight percentage of homogenous mixture based on a signal from the main control panel 600. In other embodiments according to the disclosed subject matter, the control panel 500 and the main control panel 600 are combined into a processing unit system that can provide both functions, in addition to other monitoring and controlling features. Embodiments of the disclosed subject matter contemplate any suitable control panel or computer system, as known to those of ordinary skill in the art. With the continuous processor able to separately function from the filler mixer, the continuous processor can halt production while enabling the filler mixer to carry on production.

Details regarding the method of the disclosed subject matter are understood from the detailed description above.

Generally, however, a method of processing recyclable material is provided, comprising providing recyclable material to a milling device and grinding the recyclable material into particulate by the milling device. The method further includes transferring the particulate with a transfer device, weighing the particulate with an apparatus, and at least one of reacting and mixing the particulate with at least one admixture with a continuous processor to form a homogenous mixture. The method further includes incorporating the homogenous mixture with shingle material with a filler mixer to form core product and controlling the input of homogenous mixture into the filler mixer with a control panel.

While the disclosed subject matter is described herein in terms of certain preferred and exemplary embodiments, those skilled in the art will recognize that various modifications and improvements can be made to the disclosed subject matter without departing from the scope thereof. Such as for example, the system and method can be utilized for recycled use of other non-asphalt based materials or products, such as glass. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to a recycled asphalt shingles throughout this disclosure, other suitable recyclable materials likewise can be processed using the system and method disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the system and method of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of continuous processing of recyclable material, comprising:
   measuring and outputting an amount of recyclable material with an apparatus to a continuous processor;
   supplying at least one admixture by a supply device to the continuous processor;
   at least one of continuously reacting and continuously mixing the recyclable material with the at least one admixture in the continuous processor to form a homogenous mixture having a predetermined temperature ranging from approximately 250° F. to approximately 450° F.;
   outputting the homogenous mixture at the predetermined temperature to a holding tank or directly to a filler mixer;
   controlling an amount of the homogenous mixture input from the holding tank or continuous processor into the filler mixer;
   outputting shingle material from a source into the filler mixer; and
   forming a recycled core product by incorporating up to approximately 30% of the homogenous mixture at the predetermined temperature with the shingle material in the filler mixer, wherein the filler mixer is independently operable from the continuous processor to enable the filler mixer to selectively form at least one of the recycled core product or an unrecycled core product.

2. The method according to claim 1, wherein the at least one of continuously reacting and continuously mixing the recyclable material with the at least one admixture in the continuous processor to form the homogenous mixture includes a predetermined residence time, wherein the predetermined residence time is a function of a capacity of the continuous processor and operation of a mixing system of the continuous processor.

3. The method according to claim 1, further comprising varying a rate and volume of the homogenous mixture input into the filler mixer.

4. The method according to claim 2, wherein the predetermined residence time comprises up to and including about 20 minutes.

5. The method according to claim 1, further comprising outputting an amount of recyclable material with the apparatus to a holding device.

6. The method according to claim 2, wherein the mixing includes mixing the recyclable material with the at least one admixture with a paddle system, a screw system, and a shaft support system.

7. The method according to claim 1, wherein the continuously mixing transfers energy into the homogenous mixture and heats the recyclable material and the at least one admixture.

8. The method according to claim 1, wherein the continuous processor comprises a mechanical heat transfer of from approximately 12,000 BTUs to approximately 75,000 BTUs.

9. The method according to claim 1, further comprising controlling a rate and volume of the recyclable material output to the continuous processor with the apparatus.

10. The method according to claim 1, wherein the continuous processor forms the homogenous mixture at a rate ranging from approximately 1,000 lbs/hour to approximately 20,000 lbs/hour.

11. The method according to claim 1, wherein the continuous processor further comprises at least one oil jacket, and the method further comprises at least one of heating and cooling the homogenous mixture with the oil jacket of the continuous processor.

12. The method according to claim 1, further comprising continuously receiving the homogenous mixture from the continuous processor with the filler mixer.

13. The method according to claim 1, further comprising controlling an input of the homogenous mixture into the filler mixture with a control panel.

14. The method according to claim 13, further comprising controlling the continuous processor with a main control panel.

15. The method according to claim 14, wherein the controlling an input comprises varying a weight percentage of the homogenous mixture based on a signal from the main control panel.

16. The method according to claim 1, further comprising forming the homogenous mixture with a specific gravity ranging from approximately 1 to approximately 3.5.

17. The method according to claim 1, wherein the amount of recyclable material output into the continuous processor forms from approximately 5 weight percent to approximately 70 weight percent of the homogenous mixture.

18. The method according to claim 1, further comprising
providing the recyclable material to a milling device;
grinding the recyclable material into particulate form with the milling device; and
transferring the particulate form of the recyclable material to the apparatus.

19. The method according to claim 18, further comprising providing a recyclable material comprising recycled asphalt shingles.

20. The method according to claim 18, further comprising transferring the particulate form to a separation system and separating the particulate form based on a particle size.

21. The method according to claim 18, wherein the transferring the particulate form to the apparatus comprises:
receiving the particulate form with a transfer system comprising a hopper;
storing an influx of the particulate form within the transfer system; and
outputting the particulate form with a bin activator feeder.

22. The method according to claim 21, further comprising controlling the transfer system and the bin activator feeder with a control panel.

\* \* \* \* \*